United States Patent [19]
Kasuya

[11] Patent Number: 5,930,054
[45] Date of Patent: Jul. 27, 1999

[54] LENS POSITION CONTROL APPARATUS

[75] Inventor: Junichi Kasuya, Ageo, Japan

[73] Assignee: Canon Kabushiki Kaisha, Tokyo, Japan

[21] Appl. No.: 09/045,315

[22] Filed: Mar. 20, 1998

[30] Foreign Application Priority Data

Mar. 31, 1997 [JP] Japan .................................. 9-098406

[51] Int. Cl.⁶ .................................................. G02B 15/14

[52] U.S. Cl. ........................... 359/698; 359/697; 396/85; 396/104; 396/119; 396/123

[58] Field of Search ...................... 359/694, 697, 359/698; 396/119, 123, 104, 131, 133, 55, 85

[56] References Cited

U.S. PATENT DOCUMENTS

| | | | |
|---|---|---|---|
| 4,861,146 | 8/1989 | Hatase et al. | 359/698 |
| 4,881,799 | 11/1989 | Ohno et al. | 359/698 |
| 5,130,735 | 7/1992 | Husaka et al. | 396/104 |
| 5,134,525 | 7/1992 | Kaneda | 359/697 |

Primary Examiner—Loha Ben
Attorney, Agent, or Firm—Robin, Blecker & Daley

[57] ABSTRACT

A lens position control apparatus includes an absolute position detecting part for detecting the absolute position of a lens, a relative position detecting part for detecting the relative position of the lens, a driving part for driving the lens, and a control part for controlling the driving part to drive the lens to a predetermined position within a driving range of the lens on the basis of an output of the absolute position detecting part and, after that, drive the lens to an end position of the driving range on the basis of an output of the relative position detecting part, so that the lens position control can be promptly initialized.

7 Claims, 4 Drawing Sheets

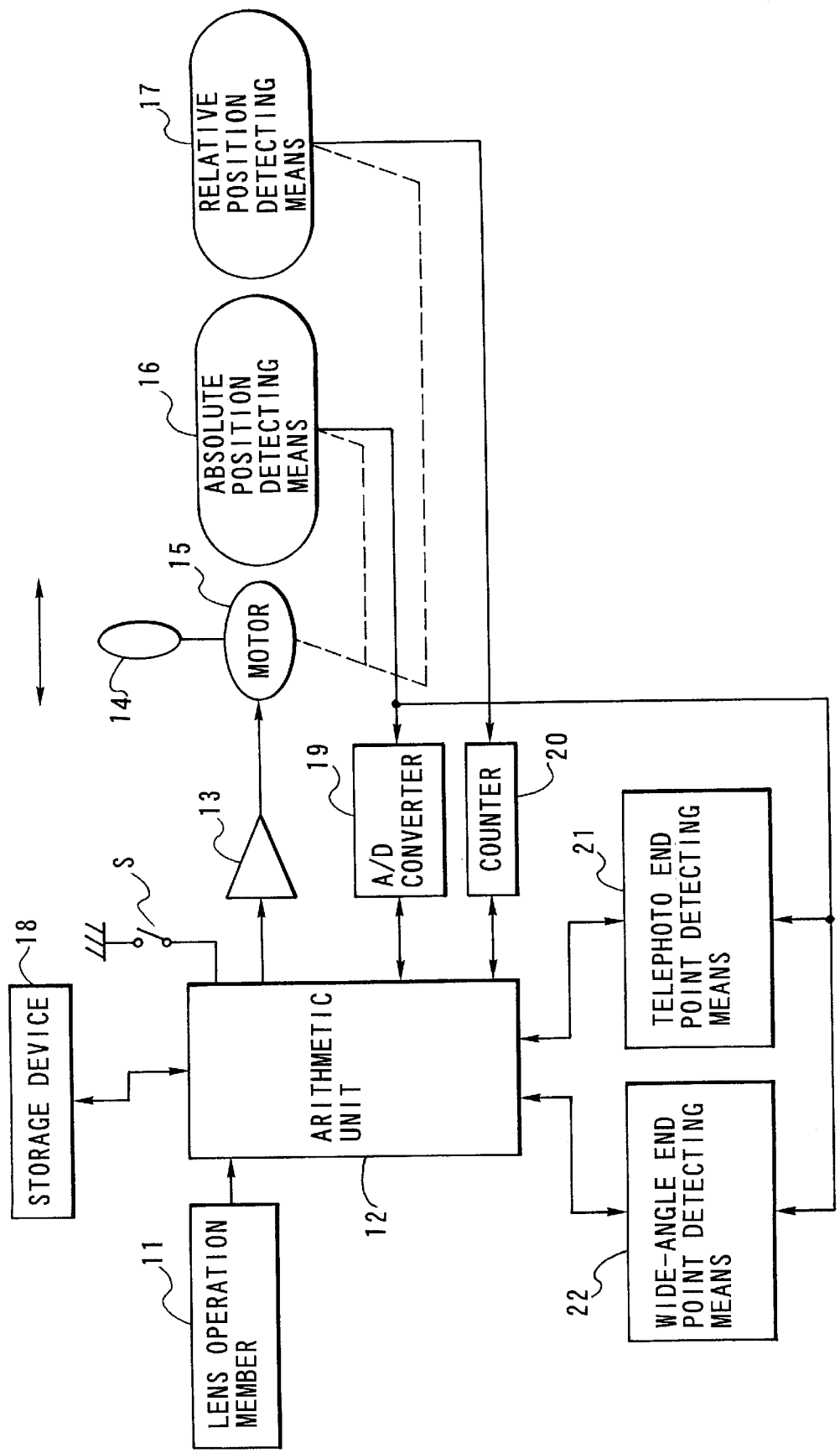

LENS POSITION CONTROL APPARATUS

BACKGROUND OF THE INVENTION

1. Field of the Invention

The present invention relates to a zoom lens adapted for use in a television camera.

2. Description of Related Art

FIG. 3 is a block diagram showing the arrangement of a zoom driving part of a conventional zoom lens. A signal output of a zoom demand (operation) part 1 is connected through a limit circuit 2 to the positive terminal of a subtracter 3 and an amplifier 4 one after the other. The output of the amplifier 4 is connected to a motor 6 which is arranged to drive a zooming lens 5. A speed detecting means 7 for detecting the angular velocity of the motor 6, such as a tachometer generator, is connected to the motor 6. A signal outputted from the speed detecting means 7 is fed back to the negative terminal of the subtracter 3. A so-called speed feedback control system is thus formed by the subtracter 3, the amplifier 4, the motor 6 and the speed detecting means 7. The zooming lens 5 is controlled and driven by this speed feedback control system.

An absolute position detecting means 8, such as a potentiometer, arranged to detect the absolute position of the zooming lens 5 is also connected to the motor 6. The output of the absolute position detecting means 8 is connected to the limit circuit 2.

In the above-stated arrangement, the relation of a signal output of the absolute position detecting means 8 to the position of the zooming lens 5 is uniquely determined. Therefore, it is possible to construct the limit circuit 2 in such a way that the value of the input to the positive terminal of the subtracter 3 becomes "0" at a mechanical end point of a zoom lens driving mechanism according to a predetermined speed reduction curve.

Therefore, the zooming lens 5 can be driven and moved to a desired position by arbitrarily operating the zoom demand part 1 the instant electric power is supplied to the zoom lens. When the zooming lens 5 comes near the mechanical end point of the zoom lens driving mechanism, the limit circuit 2 acts to make a speed command signal "0" irrespective of the intention of the operator. The limit circuit 2 thus enables the operator to operate the zoom lens without taking heed to the possibility of having the zooming lens 5 bumping against the mechanical end point.

Meanwhile, during recent years, a higher degree of control has come to be required with respect to lens systems, because there have arisen various demands. The demands, for example, include a demand for a function of eliminating changes in angle of view due to focusing by correcting such changes by zooming. Another demand is for a severe control over the focal length of a lens in use, for example, at a virtual studio or the like where actual video images are broadcasted in combination with computer graphics. These demands require a higher degree of position control than the conventional control level. Therefore, to meet such requirements, lens systems have been developed to include therein built-in arithmetic units such as microcomputers and to control lens positions by means of the built-in arithmetic units.

For carrying out position control with a higher degree of precision, these lens systems are arranged, in most cases, to use encoders as position detectors in place of potentiometers which have conventionally been used as main position detectors, because use of the encoder makes processes to be carried out with the microcomputer easier.

However, in a case where the encoder in use is arranged to detect an absolute position, i.e., in the event of a so-called absolute-type encoder, the encoder is larger in size, more expensive and has lower resolution than a so-called incremental-type encoder which detects a relative position. The incremental-type encoder is small in size and has a high resolution. However, with the incremental-type encoder used, it is impossible to decide the absolute position of the lens at the time when a power supply is turned on. Hence, the use of the incremental-type encoder necessitates, before the lens is operated, a process of deciding the absolute position of the lens by driving the lens to a datum position at the time when a power supply is turned on. Since the lens must be driven to a datum position, as its absolute position is unknown at the time of turning-on of a power supply, the method of using an incremental-type encoder takes time before the lens reaches the datum position. Besides, the datum position tends to vary due to some factor such as backlash.

BRIEF SUMMARY OF THE INVENTION

The invention is directed to the solution of the above problems. It is, therefore, a general object of the invention to provide a lens position control apparatus which uses a compact and low-cost incremental-type encoder and yet is capable of accurately performing lens control by promptly detecting a datum position without being affected by factors such as backlash.

To attain the above object, in accordance with an aspect of the invention, there is provided a lens position control apparatus, which comprises absolute position detecting means for detecting an absolute position of a lens, relative position detecting means for detecting a relative position of the lens, driving means for driving the lens, and control means for controlling the driving means to drive the lens to a predetermined position within a driving range of the lens on the basis of an output of the absolute position detecting means and, after that, drive the lens to an end position of the driving range on the basis of an output of the relative position detecting means.

More specifically, the control means is arranged to control the driving means to drive the lens while comparing a position detection signal of the absolute position detecting means with the predetermined position within the driving range of the lens and, after that, drive the lens to the end position of the driving range while comparing a detection signal of the relative position detecting means with the end position of the driving range.

The above and other objects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 1A is a block diagram showing the arrangement of a lens position control apparatus according to an embodiment of the invention.

DETAILED DESCRIPTION OF THE INVENTION

Figure 1B:
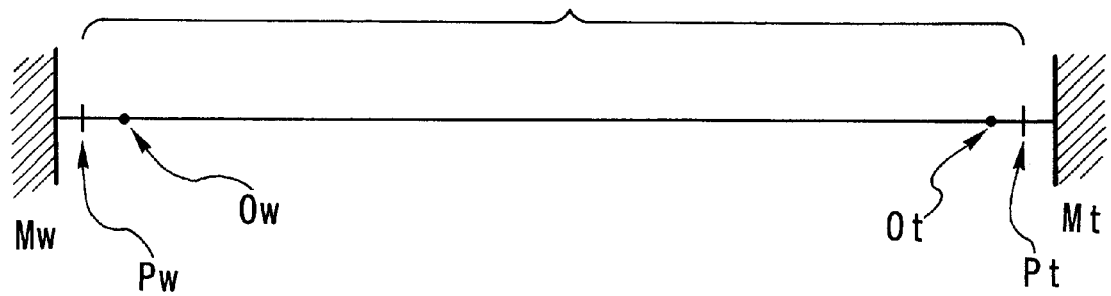
FIG. 1B shows a moving range of the lens in the embodiment.

Hereinafter, a preferred embodiment of the invention will be described in detail with reference to the drawings.

FIG. 1A shows in a block diagram the arrangement of a lens position control apparatus according to the embodiment of the invention. Referring to FIG. 1A, a lens operation member 11 is arranged to output a signal demanding for zooming or focusing. The signal from the lens operation member 11 is supplied through a signal line to an arithmetic unit 12 which is a microcomputer or the like arranged to compute the value of a command for driving a lens 14. The arithmetic unit 12 is arranged to control the driving position of the lens 14 by using a position command value for the lens 14, which is driven at intervals of predetermined sampling time, obtained from a relative position detecting means 17 of the incremental type, and using a signal, which shows the actual position of the lens 14, obtained from an absolute position detecting means 16, such as a potentiometer.

The output of the arithmetic unit 12 is connected through an amplifier 13 to a motor 15 which is arranged to drive the lens 14. The motor 15 is coupled to the absolute position detecting means 16 and the relative position detecting means 17. The absolute position detecting means 16 is a potentiometer or the like and is arranged to detect the absolute position of the lens 14. The relative position detecting means 17 which is an incremental-type rotary encoder or the like is arranged to detect the relative position of the lens 14 and to output a pulse train according to the relative position detected. Compared with use of a potentiometer, the use of a rotary encoder gives a higher resolution and permits more accurate position control.

To the arithmetic unit 12 (control means) are connected a storage device 18, an A/D converter 19, a counter 20, a telephoto end point detecting means 21 and a wide-angle end point detecting means 22. The storage device 18 is arranged to store information required for initially setting the lens 14 or a control program for the lens 14. The counter 20 is arranged to perform an adding or subtracting operation on a digital signal obtained in the form of a pulse train from the absolute position detecting means 17. The telephoto end point detecting means 21 and the wide-angle end point detecting means 22 are respectively arranged to detect end points of an optical driving range. The output of the absolute position detecting means 16 is connected to the A/D converter 19 and to the telephoto end point detecting means 21 and the wide-angle end point detecting means 22. The output of the relative position detecting means 17 is connected to the counter 20. Reference symbol S denotes a power supply switch. The arithmetic unit 12 detects whether the power supply is turned on or turned off through the state of the switch S.

FIG. 1B shows the moving range of the lens 14 in the embodiment. In FIG. 1B, reference symbol Mw denotes a mechanical end on the wide-angle side of the lens 14, and reference symbol Mt denotes a mechanical end on the telephoto side of the lens 14. The interval between reference symbols Pw and Pt indicates a zoom driving range within which the lens 14 actually moves for zooming. The zoom driving range is defined by the optical wide-angle end point Pw and the optical telephoto end point Pt. Reference symbols Ow and Ot respectively denote wide-angle-side and telephoto-side target positions within the zoom driving range. The wide-angle-side target position Ow is set beforehand at a point near to the optical wide-angle end point Pw. The telephoto-side target position Ot is set also beforehand at a point near to the optical telephoto end point Pt. Pieces of information on the optical wide-angle end point Pw and the optical telephoto end point Pt are stored respectively at the wide-angle end point detecting means 22 and the telephoto end point detecting means 21.

In an initial state of the lens position control apparatus, the arithmetic unit 12 (control means) first causes the lens 14 to be driven by the motor 15 to the target position Ow at a high speed, for example, in response to a signal indicating that the power supply is turned on. Then, according to a detection signal from the absolute position detecting means 16, the arithmetic unit 12 finds if the position of the lens 14 has reached the target position Ow by comparing the detection signal with the target position Ow. Upon arrival of the lens 14 at the target position Ow, the arithmetic unit 12 causes the lens 14 to be driven to the optical wide-angle end point Pw at a speed lower than the above-stated high speed. Then, the arithmetic unit 12 finds if the lens 14 has reached the optical wide-angle end point Pw, on the basis of a detection signal of the wide-angle end point detecting means 22. In this instance, the arithmetic unit 12 counts the number of pulses of the encoder obtained for a distance from the target position Ow to the optical wide-angle end point Pw, and stores this number. After that, the arithmetic unit 12 controls the driving action on the lens 14 according to a detection signal from the relative position detecting means 17 by using, as a datum or reference value, the information on the optical wide-angle end point Pw thus stored.

As mentioned above, the arithmetic unit 12 first causes the lens 14 to be driven while comparing the position detecting signal of the absolute position detecting means 16 with the predetermined target position Ow within the driving range of the lens 14. After that, the arithmetic unit 12 causes the lens 14 to be driven to the wide-angle end point Pw of the driving range while counting the detecting signal of the relative position detecting means 17.

Control over the lens position on the side of the telephoto end of the lens driving range is performed in the same manner as in the case of the control over the lens position on the side of the wide-angle end described above. The lens driving range between the optical wide-angle end point Pw and the optical telephoto end point Pt for use in the relative position detecting means 17 is thus determined as mentioned above. After that, lens position control is carried out with a high degree of precision by using the output of the relative position detecting means 17.

Therefore, in an actual zooming operation by the camera operator, the lens position is controlled by using the relative position detecting means which gives a higher resolution than the conventional lens position control using the absolute position detecting means which uses a potentiometer or the like. Therefore, compared with the conventional arrangement, the arrangement described above enables the embodiment to control lens positions with a higher degree of precision.

As described above, in carrying out the initial setting for lens position control, the embodiment at first drives the lens at a high speed to a predetermined target position and, after that, the optical wide-angle end point is detected by driving the lens at a slower speed. The length of time required for initial setting thus can be shortened by virtue of this arrangement.

Figure 2:
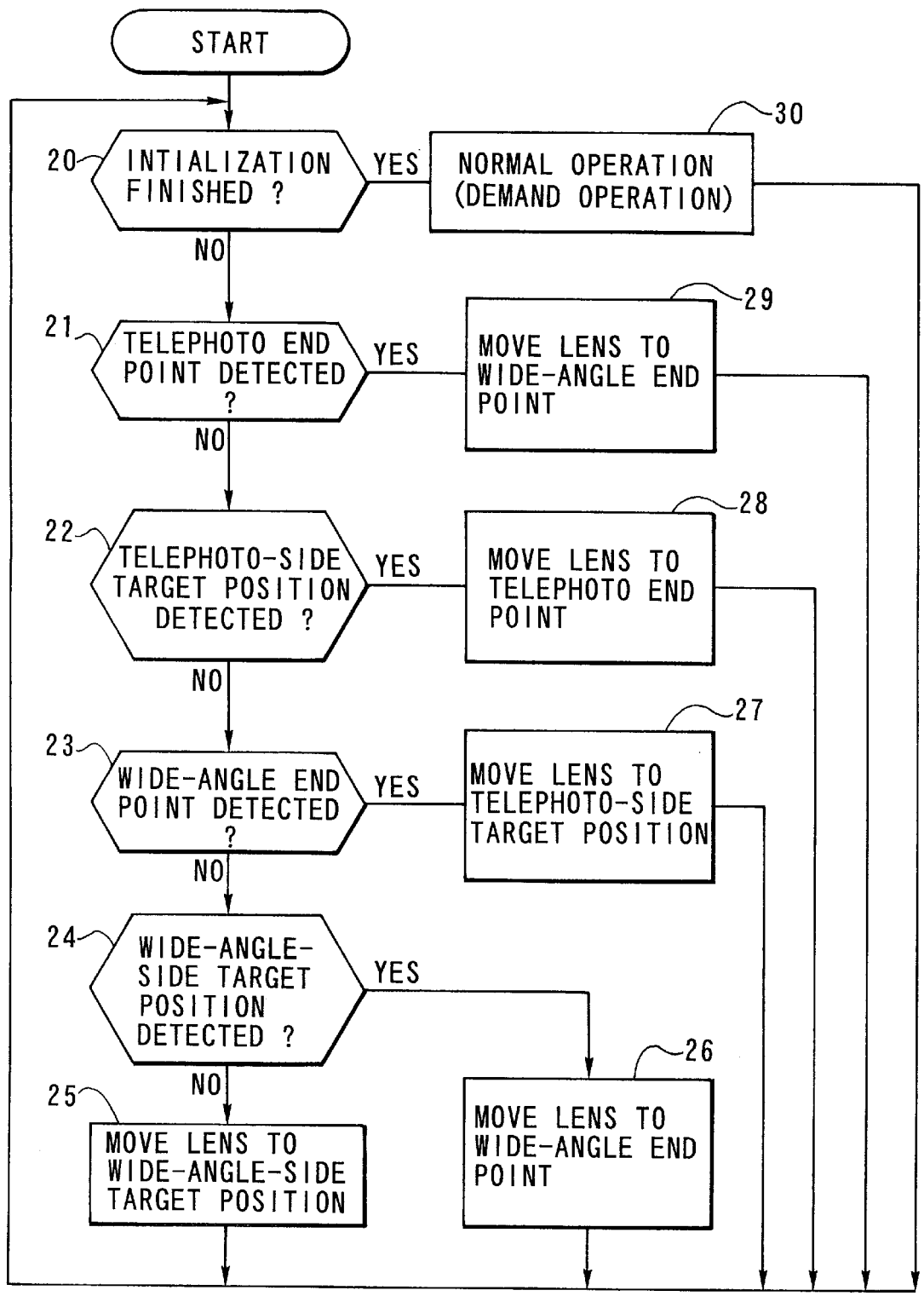
FIG. 2 is a flow chart showing a flow of operation of the embodiment.
Figure 3:
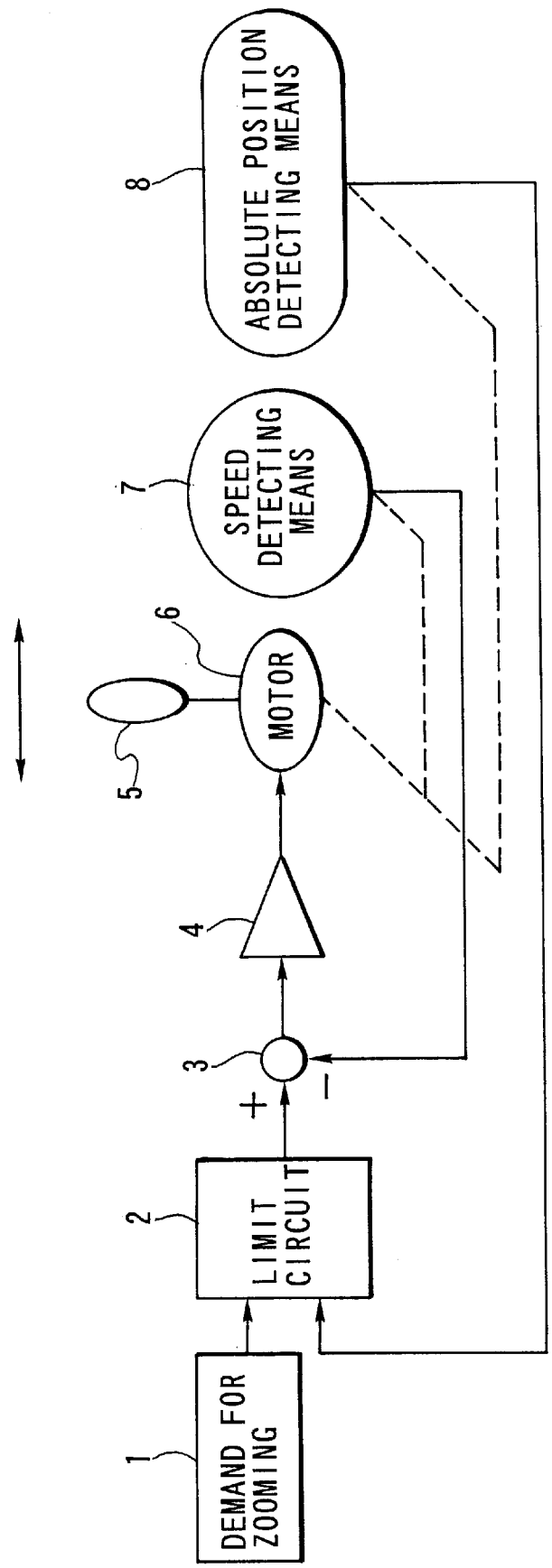
FIG. 3 is a block diagram showing the arrangement of a zoom driving part of the conventional zoom lens.

FIG. 2 shows in a flow chart a series of actions to be performed in the embodiment immediately after the power supply is turned on until the end point positions of the lens 14 are detected. Referring to FIG. 2, the flow of operation in the arithmetic unit 12 proceeds to a step 20 when the power supply is turned on. In order to accurately carry out position control, it is necessary to use the rotary encoder for the position control. It is, therefore, necessary to initialize the control system for detection of the wide-angle end-point position and the telephoto end-point position for use in the relative position detecting means 17.

At the step 20, a check is made to find if the process of initialization has been finished. Immediately after the power supply is turned on, the initialization is not finished. Therefore, in its initial stage, the flow proceeds from the step 20 to a step 21. At the step 21, a check is made to find if the telephoto end point Pt of the zoom driving range has been detected by the telephoto end point detecting means 21. Since this detecting process has not been finished as yet in this instance, the flow proceeds to the next step 22.

At the step 22, a check is made to find if the telephoto-side target position Ot which is set beforehand at a point located more inward than the telephoto end point Pt of the zoom driving range has been detected. If not, the flow proceeds to a step 23. At the step 23, a check is made to find if the wide-angle end point Pw has been detected by the wide-angle end point detecting means 22. If not, the flow proceeds to a step 24.

At the step 24, a check is made to find if a wide-angle-side target position Ow which is set beforehand at a point located more inward than the wide-angle end point Pw has been detected. If not, the flow proceeds to a step 25.

At the step 25, position control is performed to drive the lens 14 at a high speed to the wide-angle-side target position Ow by comparing with each other a target position signal which indicates the wide-angle-side target position Ow and an absolute position signal which is outputted from the absolute position detecting means 16 to indicate the actual position of the lens 14. When the position of the lens 14 reaches the wide-angle-side target position Ow, the target position signal and the absolute position signal coincide with each other. Then, the flow of operation of the arithmetic unit 12 returns to the step 20.

Next, the flow of operation of the arithmetic unit 12 proceeds from the step 20 to the steps 21, 22, 23 and 24 one after the other. Then, since the lens 14 has already been moved to the wide-angle-side target position Ow this time, the flow proceeds to a step 26. At the step 26, by using a signal from the relative position detecting means 17, a predetermined value is added, at every sampling time, to a position command value which is last obtained, thereby obtaining a current command value. According to the current command value, the lens 14 is driven at a relatively low speed to the wide-angle end point Pw. Then, at a point where an end-point position signal outputted from the wide-angle end point detecting means 22 is detected, the count value of the counter 20 is set at an arbitrary value indicating the wide-angle end point Pw. This value of the counter 20 is stored in the storage device 18. Accordingly, the process of detecting the position of the wide-angle end point Pw for use in the relative position detecting means 17 comes to an end.

Then, the flow of operation of the arithmetic unit 12 again proceeds to the steps 20, 21, 22 and 23 one after the other in that order. At the step 23, since the wide-angle end point Pw has already been detected by this time, the flow proceeds to a step 27. At the step 27, a command for the telephoto-side target position Ot is issued. The lens 14 is driven at a high speed to the telephoto-side target position Ot under position control performed by using, as a following signal, a signal which comes from the relative position detecting means 17 indicating the actual position of the lens 14. When the position of the lens 14 reaches the telephoto-side target position Ot, the flow of operation of the arithmetic unit 12 again returns to the step 20. The flow then proceeds further to the steps 21 and 22 one after the other. Since the telephoto-side target position Ot has already been detected by then, the flow proceeds from the step 22 to a step 28. At the step 28, the lens 14 is driven at a relatively low speed to the telephoto end point Pt by using, as at the step 26, a signal coming from the relative position detecting means 17. A count value of the counter 20 obtained at a position where an end-point position signal from the telephoto end point detecting means 21 is detected is stored in the storage device 18. This value is set as the position of the telephoto end point Pt for use in the relative position detecting means 17.

The processes carried out up to this step of the flow enable the arithmetic unit 12 to recognize the wide-angle end point Pw and the telephoto end point Pt for use in the relative position detecting means 17. Since the lens driving range for use in the relative position detecting means 17 is thus set, the position of the lens 14 within the driving range has become controllable by using the relative position detecting means 17.

After the step 28, the flow of operation of the arithmetic unit 12 again returns to the step 20 and further to the next step 21 to make the check for detection of the telephoto end point Pt. Since the telephoto end point Pt has already been detected, the flow proceeds from the step 21 to a step 29. At the step 29, the lens 14 is caused to be moved to the position of the wide-angle end Pw under position control performed by using the value of the wide-angle end point Pw stored in the storage device 18 as a command value and a signal of the actual lens position coming from the relative position detecting means 17 as a following signal. When the lens moving action comes to an end, the arithmetic unit 12 detects completion of the process of initialization.

The arrival of the lens 14 at the wide-angle end point Pw enables the camera operator to see an angle of view covering a wide range, which is advantageous in operating the camera. With the lens 14 having been moved to the wide-angle end point Pw, the flow of operation of the arithmetic unit 12 again returns to the step 20 to make a check for completion of the initialization. Since the initializing process has already been finished this time, the flow proceeds from the step 20 to a step 30. At the step 30, the position of the lens 14 is controlled at a high degree of precision in accordance with a signal, i.e., a command signal, coming from the lens operation member 11 by using a following signal outputted from the relative position detecting means 17.

After the step 30, the arithmetic unit 12 allows the lens 14 to be operated from the lens operation member 11 by repeating the steps 20 to 30 until the supply of power is cut off.

In performing the position control by using the relative position detecting means 17 as described above, when the power supply is turned on, a process of detecting an end point of the lens driving range is performed always in the predetermined direction. This arrangement enables the embodiment to detect a datum position without being affected by mechanical backlash or the like.

In the case of the embodiment disclosed, the invention is applied to a zooming lens. However, the invention likewise applies to a case where a focusing lens, instead of the zooming lens, is to be driven by using the relative position detecting means 17. In that case, the lens position control can be also accurately carried out by detecting the datum position in the same manner as described above except that the lens driving range is between an infinity distance end and a nearest distance end in the case of the focusing lens, whereas the lens driving range for the zooming lens is between the wide-angle end and the telephoto end.

The embodiment disclosed is arranged to move the lens 14 always to the wide-angle-side target position by using the absolute position detecting means 16 when the power supply is turned on. However, the same advantageous effect is attainable within a short period of time by changing this arrangement to detect a driving end point by moving the lens 14 either to the wide-angle-side target position or to the telephoto-side target position, whichever happens to be closer to the lens position obtained at the time when the power supply is turned on.

With the storage device 18 arranged to retain information stored therein even when power is not supplied, once the driving end point is detected and a distance from the driving end point to the end point is determined and stored, the position control can be also accurately accomplished within one half of the period of time required for the first round of control as described above by detecting only one of end-point positions and by using the stored information on the distance from the driving end point to the end point when the power supply is turned on for the second time and thereafter.

As described in the foregoing, the lens position control apparatus according to the invention is arranged to be capable of promptly setting the lens in an initial position and, after that, to accurately control the lens position by means of the relative position detecting means which is composed of a rotary encoder or the like. Further, the embodiment is arranged to detect the end point of the lens driving range by performing the detecting process always in the predetermined direction. The adverse effect of mechanical backlash or the like can be eliminated by this method. At the time when the power supply is turned on, the position control is performed by using the output of the absolute position detecting means to promptly move the lens to an approximate position, so that the initial mode of control process can be shifted, within a short period of time, to the accurate mode of position control to be accomplished by using the relative position detecting means which is capable of operating with a high degree of precision.

I claim:

1. A lens position control apparatus comprising:

absolute position detecting means for detecting an absolute position of a lens;

relative position detecting means for detecting a relative position of said lens;

driving means for driving said lens; and control means for controlling said driving means to drive said lens to a predetermined position within a driving range of said lens on the basis of an output of said absolute position detecting means and, after that, drive said lens to an end position of the driving range on the basis of an output of said relative position detecting means.

2. A lens position control apparatus according to claim 1, wherein said control means controls said driving means to drive said lens at a high speed to the predetermined position and drive said lens at a low speed to the end position of the driving range.

3. A lens position control apparatus according to claim 1, wherein said absolute position detecting means is a potentiometer.

4. A lens position control apparatus according to claim 1, wherein said relative position detecting means is a rotary encoder.

5. A lens position control apparatus according to claim 1, wherein said control means controls said driving means to start driving said lens in response to a signal which is inputted to said lens position control apparatus indicating that a power supply is turned on.

6. A lens position control apparatus according to claim 1, further comprising storage means for storing information on the end position of the driving range of said lens detected by said relative position detecting means.

7. A lens position control apparatus according to claim 1, wherein said control means controls said driving means to drive said lens while comparing a position detection signal of said absolute position detecting means with the predetermined position within the driving range of said lens and, after that, drive said lens to the end position of the driving range while comparing a detection signal of said relative position detecting means with the end position of the driving range.

* * * * *

UNITED STATES PATENT AND TRADEMARK OFFICE
CERTIFICATE OF CORRECTION

PATENT NO. : 5,930,054
DATED : July 27, 1999
INVENTOR(S) : Junichi Kasuya

It is certified that error appears in the above-identified patent and that said Letters Patent is hereby corrected as shown below:

Col. 1, line 13, after "3" delete "and" and insert --the output of which is supplied to--.

Col. 1, line 13, after "amplifier 4" delete "one after the other".

Col. 1, line 45, after "without" delete "taking heed to" and insert --concern for--.

Signed and Sealed this

Twentieth Day of March, 2001

*Attest:*

NICHOLAS P. GODICI

*Attesting Officer*     *Acting Director of the United States Patent and Trademark Office*